(12) United States Patent
Ohta et al.

(10) Patent No.: US 7,050,281 B2
(45) Date of Patent: May 23, 2006

(54) DEVICE AND METHOD FOR DETERMINING RARE SHORT CIRCUIT

(75) Inventors: Manabu Ohta, Ogaki (JP); Hideaki Shibata, Ogaki (JP)

(73) Assignee: Pacific Engineering Corp., Ogaki (JP)

( * ) Notice: Subject to any disclaimer, the term of this patent is extended or adjusted under 35 U.S.C. 154(b) by 667 days.

(21) Appl. No.: 09/944,698

(22) Filed: Aug. 31, 2001

(65) Prior Publication Data

US 2002/0008951 A1  Jan. 24, 2002

(30) Foreign Application Priority Data

Sep. 4, 2000  (JP) ....................... 2000-267402

(51) Int. Cl.
H02H 3/00  (2006.01)

(52) U.S. Cl. ...................... 361/93.9; 361/104
(58) Field of Classification Search ............... 361/931, 361/93.8, 97, 98, 100, 101, 103, 104, 93.2, 361/93.7, 93.9; 324/522
See application file for complete search history.

(56) References Cited

U.S. PATENT DOCUMENTS

| 4,023,264 A |   | 5/1977 | Schmidt, Jr. et al. |
| 5,359,293 A |   | 10/1994 | Boksiner et al. ............ 324/544 |
| 5,926,010 A |   | 7/1999 | Hosokawa et al. ......... 323/908 |
| 6,011,416 A | * | 1/2000 | Mizuno et al. ............. 327/108 |
| 6,141,202 A | * | 10/2000 | Maeckel et al. ............ 361/187 |

| 2003/0142449 A1 | * | 7/2003 | Iwata et al. ................... 361/58 |

FOREIGN PATENT DOCUMENTS

| JP | 61-191231 A | 8/1986 |
| JP | 01-121553 | 11/1987 |
| JP | 07-131925 | 5/1995 |
| JP | 2001-045661 | 2/2001 |
| RU | 2089031 C1 | 8/1997 |
| RU | 2092867 C1 | 10/1997 |

OTHER PUBLICATIONS

US 2003/0142449 A1 Iwata et al. 361/58.*

* cited by examiner

*Primary Examiner*—Ronald Leja
(74) *Attorney, Agent, or Firm*—Cherskov & Flaynik

(57) ABSTRACT

A device for easily determining whether a rare short circuit, which results from the generation of heat exceeding a predetermined value, has occurred in a load circuit. The device includes a fuse for detecting a load current that flows through the load circuit and generates a detection signal. A determination circuit is connected to the fuse to determine whether a rare short circuit has occurred. The determination circuit calculates one of a first parameter and a second parameter based on the detection signal. The first parameter relates to a first time period during which the load current exceeds a predetermined reference current value. The second parameter relates to a second time period during which the load current is less than or equal to the predetermined reference current value. The determination circuit cumulates one of the parameters every predetermined time interval to calculate a cumulative parameter value and determines whether a rare short circuit has occurred based on the cumulative parameter value.

10 Claims, 3 Drawing Sheets

DEVICE AND METHOD FOR DETERMINING RARE SHORT CIRCUIT

BACKGROUND OF THE INVENTION

The present invention relates to a device and method for determining the occurrence of a rare short circuit. More particularly, the present invention relates to a rare short circuit determining device and a rare short circuit determining method that detects abnormal current flowing through an electric circuit of an automobile.

U.S. Pat. No. 4,023,264 describes a blade fuse installed in a fuse box of an automobile. Blade fuses, which are often used in electric circuits of automobiles, have a slow-burn characteristic. Due to the slow-burn characteristic, blade fuses are not melted by momentary overcurrents but are melted by continuous overcurrents that flow for a certain period of time.

Blade fuses normally melt and break when a dead short circuit occurs but do not break when a rare short circuit occurs. A dead short circuit causes a large amount of current to continuously flow in an electric circuit. A rare short circuit causes current to flow intermittently and within a short period of time when, for example, vibrations cause the electric wiring of an automobile to contact the body of the automobile. When a rare short circuit current continuously flows through the electric wiring of the automobile, for example, the electric wiring may be heated.

Japanese Unexamined Patent Publication Nos. 61-191231 and 7-131925 describe methods for determining the occurrence of rare short circuits. However, these methods focus only on current values and do not accurately prevent electric wires from being heated.

The method described in Publication No. 7-131925 determines an abnormality level based on a cumulative value of overcurrent per unit time. Thus, rare short circuits are not accurately recognized in the method. The abnormality determination is delayed or advanced depending on how long the unit time is. Thus, if the abnormality determination is performed too early, a rush current, which is typically produced when using a lamp as the load circuit, may be determined as being abnormal.

One of the inventors of the present invention disclosed a method for determining a rare short circuit in Japanese Unexamined Patent Publication No. 2001-45651 (Japanese Patent Application No. 11-21553). In the method, the occurrence of a rare short circuit is determined based on one of at least four characteristic values. The characteristic values refer to an abnormal load current exceeding a predetermined current threshold value, the time during which abnormal current continuously flows, an ON-duty ratio, which is the ratio of the time when abnormal current is flowing relative to a predetermined time, and the number of times the abnormal load current exceeds the predetermined current threshold value. This accurately determines the occurrence of a rare short circuit. However, the determining method is complicated. Thus, there is a need to determine the occurrence of a rare short circuit in a simplified manner.

SUMMARY OF THE INVENTION

It is an object of the present invention to provide a device and method for easily and accurately determining the occurrence of a rare short circuit.

To achieve the above object, the present invention provides a rare short circuit determining device for determining whether a rare short circuit, which results from the generation of heat exceeding a predetermined value, has occurred in a load circuit. The rare short circuit determining device includes a sensor for detecting a load current, which flows through the load circuit, and for generating a detection signal. A determining circuit is connected to the sensor for determining whether a rare short circuit has occurred. The determination circuit calculates one of a first parameter and a second parameter every predetermined time interval based on the detection signal. The first parameter relates to a first time period during which the load current exceeds a predetermined reference current value. The second parameter relates to a second time period during which the load current is less than or equal to the predetermined reference current value. The determining circuit cumulates the calculated one of the parameters every predetermined time interval to calculate a cumulative parameter value and determines whether a rare short circuit has occurred based on the cumulative parameter value.

A further perspective of the present invention is a method for determining whether a rare short circuit, which results from the generation of heat exceeding a predetermined value, has occurred in a load circuit. The method includes detecting a load current that flows through the load circuit to generate a detection signal, comparing the load current with a reference current value based on the detection signal, and calculating one of a first parameter and a second parameter every predetermined time interval based on the detection signal. The first parameter relates to a first time period, during which the load current exceeds a predetermined reference current value, and the second parameter relates to a second time period, during which the load current is less than or equal to the predetermined reference current value. The method further includes cumulating the calculated one of the parameters every predetermined time interval to calculate a cumulative parameter value, determining whether the cumulative parameter value has exceeded a predetermined cumulative value, and stopping the supply of the load current to the load circuit when the cumulative parameter value exceeds the predetermined cumulative value.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
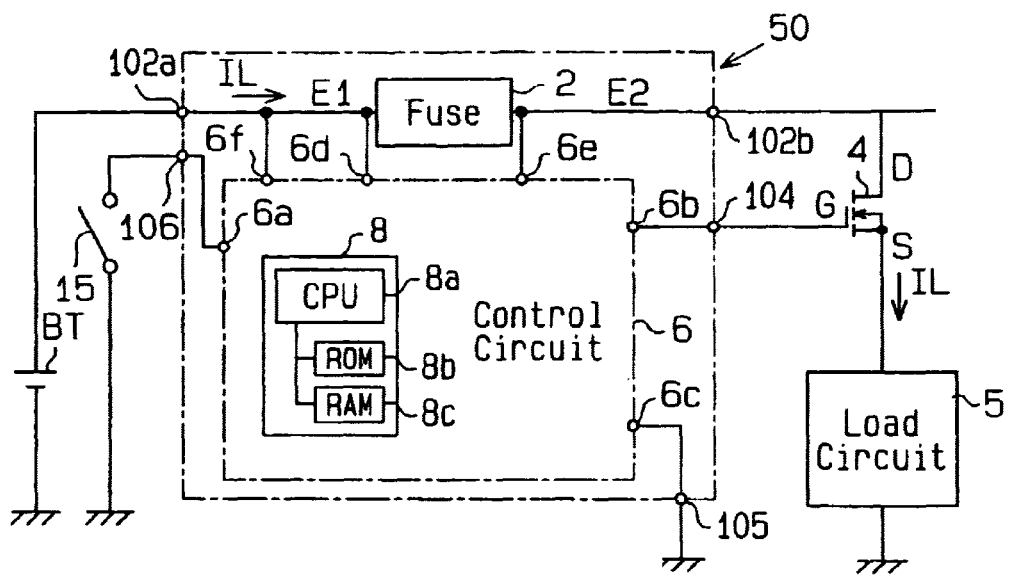
FIG. 1 is a schematic circuit diagram of a rare short circuit determining device according to the present invention.

FIG. 1 is a schematic circuit diagram of a rare short circuit determining device according to a preferred embodiment of the present invention. The rare short circuit determining device is embodied in an automobile fuse element 50 that determines the occurrence of a rare short circuit. The fuse element 50 includes a sensor (fuse) 2 and a determination circuit (control circuit) 6.

Figure 2A:
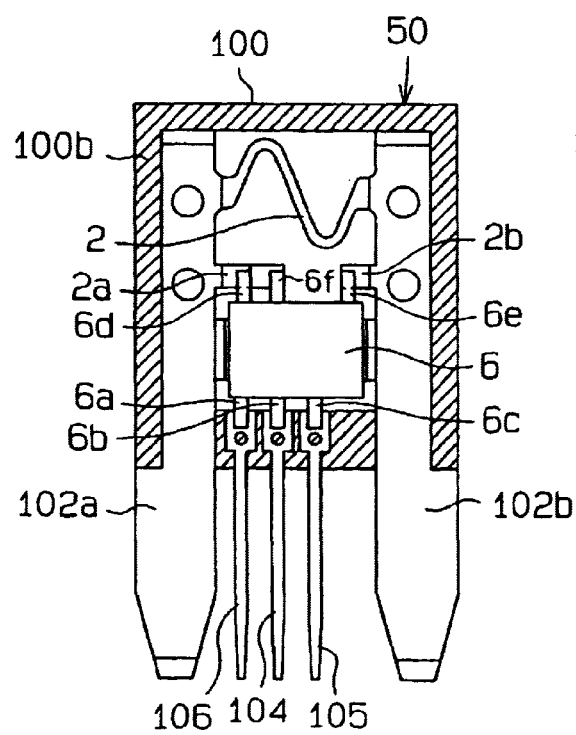
FIG. 2A is a front cross-sectional view showing the rare short circuit determining device of FIG. 1.
Figure 2B:
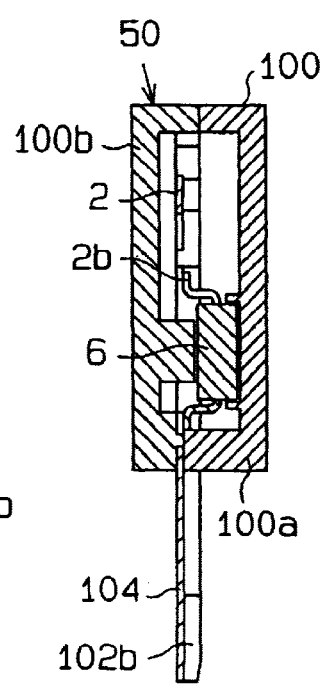
FIG. 2B is a side cross-sectional view showing the rare short circuit determining device of FIG. 1.

FIG. 2A is a front cross-sectional view of the fuse element 50, and FIG. 2B is a side cross-sectional view of the fuse element 50. As shown in FIGS. 2A and 2B, the fuse element 50 has a housing 100. The housing 100 is formed by housing cases 100a, 100b, which are made of a heat-resistant and insulative synthetic resin. Two conductive terminals 102a, 102b, which are spaced from each other, male terminals 104, 105, 106, and a control circuit 6 are arranged between the housing cases 100a, 100b. The male terminals 104, 105, 106 are located between the conductive terminals 102a, 102b. The conductive terminals 102a, 102b, and the male terminals 104, 105, 106 extend from the housing 100.

The two conductive terminals 102a, 102b are integrally connected by a thin fuse 2, the characteristics of which depend on the current capacity.

The control circuit 6 has a switch input terminal 6a, a first output terminal 6b, a second output terminal 6c, two input terminals 6d, 6e, and a power supply input terminal 6f. The input terminals 6d, 6e are connected to connecting plates 2a, 2b arranged on the inner side of the conductive terminals 102a, 102b, respectively. The switch input terminal 6a is connected to the male terminal 106, through which an SW signal is input. The first output terminal 6b is connected to the male terminal 104, which is used for a shutdown signal. The second output terminal (ground terminal) 6c is connected to the male terminal 105, which is used as a ground. The power supply input terminal 6f is connected to the connecting plate 2a.

The fuse element 50 is connected to a terminal base (not shown), which is included in an electric circuit of the automobile. A detection signal (voltage), which is based on a load current IL flowing through the fuse 2, is constantly provided to the control circuit 6 through the connecting plates 2a, 2b and the input terminals 6d, 6e. The fuse 2 has a predetermined impedance Z.

A switch 15 of a subject load is connected to the SW signal input male terminal 106. The control circuit 6 receives a switch OFF signal when the switch 15 is OFF and receives the switch ON signal when the switch 15 is ON.

As shown in FIG. 1, a battery BT of the automobile is connected to a load circuit 5 via the fuse element 50 and a power MOSFET (hereinafter, simply referred to as FET) 4, or shutdown circuit. The load circuit 5 includes, for example, a headlamp or a radio. Further, the load circuit 5 includes the electric wiring (electric lines) connected to the headlamp or radio.

The control circuit 6 of the fuse element 50 will now be discussed. The control circuit 6 includes a microcomputer 8. The microcomputer 8 includes a CPU 8a, a ROM 8b, and a RAM 8c. The ROM 8b stores a program and data for determining the occurrence of a rare short circuit. The RAM 8c temporarily stores data related to calculations used to determine the occurrence of a rare short circuit.

The fuse 2 has a terminal connected to the input terminal 6d of the control circuit 6 and another terminal connected to the input terminal 6e of the control circuit 6. A potential difference V, which is described below, is produced between the two terminals of the fuse 2 when the load current (detected current) IL that flows through the load circuit 5 and the fuse 2 has a current value Id.

$V$=power supply voltage $E1$−load voltage $E2$=impedance $z$×current value $Id$ The potential difference V is proportional to the current value Id, and the impedance Z is substantially constant. Thus, the current value Id is detected from the potential difference V.

The first output terminal 6b of the control circuit 6 is connected to the gate of the FET 4 via the shutdown signal male terminal 104. When the FET 4 receives a FET ON signal from the control circuit 6, the portion between the drain and source of the FET 4 is conductive. This supplies the load circuit 5 with the load current IL. When the FET 4 receives a FET OFF signal from the control circuit 6, the portion between the drain D and the source S is nonconductive. This stops the load current IL to the load circuit 5.

Figure 3:
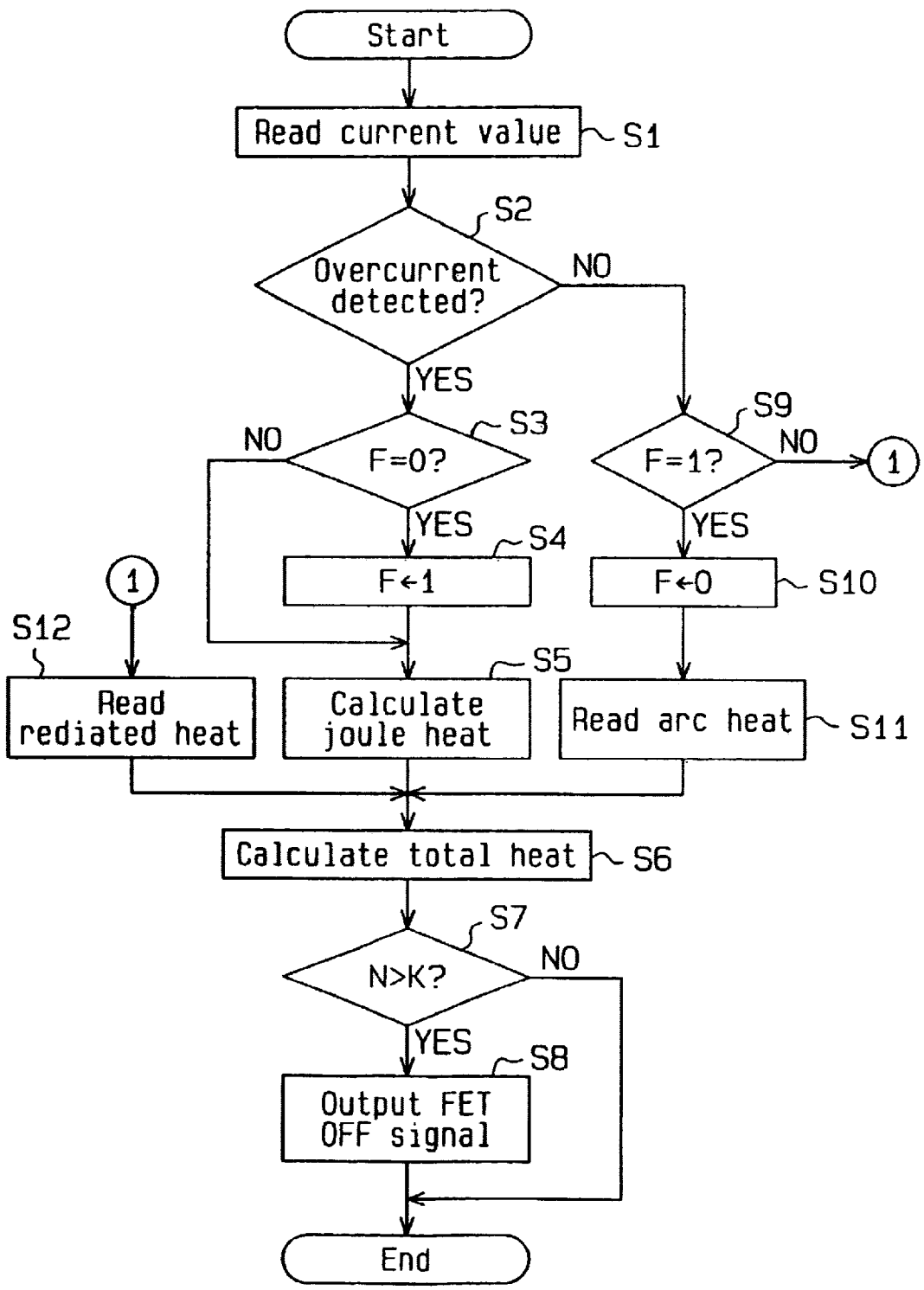
FIG. 3 is a flowchart illustrating a rare short circuit determining program executed by a determining circuit of the rare short circuit determining device of FIG. 1.

The operation of the fuse element 50 will now be described. FIG. 3 is a flowchart illustrating a program for determining the occurrence of a rare short circuit. The program is executed by the CPU 8a of the microcomputer 8.

The program is used to determine the occurrence of a rare short circuit, which results from the generation of heat exceeding a predetermined value, in the load circuit 5. When it is determined that a rare short circuit has occurred, the supply of load current IL to the load circuit 5 is stopped.

The program is started after the control circuit 6 receives the switch ON signal and the CPU 8a is initialized. Subsequent to the initialization, the CPU 8a provides the FET ON signal to the gate of the FET 4 and activates the FET 4. Afterward, the program is executed during cyclic interruptions that take place at predetermined time intervals, for example, every 0.1 msec. The predetermined time interval is much shorter than the time during which a rush current is produced. The production of a rush current is a normal phenomenon that occurs when using a lamp.

In step S1, the CPU 8a reads the load current value Id. In step S2, the CPU 8a determines whether an overcurrent has been produced. The production of an overcurrent is determined by comparing the load current value Id to a predetermined current threshold value. The predetermined current threshold value is stored in the ROM 8b. If the load current value Id is less than or equal to the predetermined threshold value, the CPU 8a determines that an overcurrent is not being produced. If the current value Id exceeds the predetermined threshold value, the CPU 8a determines that an overcurrent is being produced.

If it is determined that an overcurrent is not being produced in step S2, the CPU 8a proceeds to step S9. If it is determined that an overcurrent is being produced in step 2, the CPU 8a proceeds to step S3.

In step S3, the CPU 8a determines whether an overcurrent detection flag F is 0 (reset). The overcurrent detection flag F is used to determine whether the present overcurrent detection is an initial detection. If the overcurrent flag F is 0, the CPU 8a determines that the present overcurrent detection is the initial detection. The CPU 8a then proceeds to step S4 and sets the overcurrent detection flag F to 1.

Then, in step S5, the CPU 8a calculates an ON time (first time period), which is the time that elapses when the overcurrent continuously flows, and calculates the joule heat J based on the ON time. The CPU 8a then proceeds to step S6. The ON time is measured by, for example, an ON time counter (not shown). The CPU 8a calculates the ON time based on the count value of the ON time counter.

If the overcurrent detection flag F is 1 in step S3, the present overcurrent detection is not the initial detection. Thus, the CPU 8a proceeds to step S5.

In step S9, the CPU 8a determines whether the overcurrent detection flag F is 1 when overcurrent is not being produced. If it is determined that the overcurrent detection flag F is 1, the CPU 8a determines that an overcurrent was detected during the previous execution of the program and that an overcurrent has not been detected in the present execution. The CPU 8a thus proceeds to step S10 and resets the overcurrent detection flag F to 0. Then, in step S11, the CPU 8a reads a value representing arc heat A from the ROM 8b and proceeds to step S6.

If the overcurrent detection flag F is not 1 in step S9, the CPU 8a determines that overcurrent was not detected during the previous execution of the program and proceeds to step S12.

In step S12, the CPU 8a reads a value representing radiated heat L from the ROM 8b and proceeds to step S6.

In step S6, the CPU 8a calculates a total heat N. The calculation of the total heat N will now be discussed.

The total heat N is calculated by adding or subtracting the joule heat J, the arc heat A, or the radiated heat L, which were calculated in the current execution of the program, to or from a value of heat that was cumulated up to the previous execution of the program.

The total heat N is a function of the joule heat J, the arc heat A, and the radiated heat L and is expressed by equation (1).

$$N = F(J, A, L) = \text{cumulative value of previous cycle} + \text{present heat} \quad (1)$$

The joule heat J is related to the ON time and the detected current value Id. In the preferred embodiment, the joule heat J is measured beforehand, and a three-dimensional map associating the joule heat J with the ON time and the detected current value Id is stored in the ROM 8b.

In step S5, the CPU 8a calculates the joule heat J corresponding to the overcurrent detected in the present execution from the map when the ON time and the overcurrent value Id are detected. If the ON time continues, the CPU 8a proceeds from step S5 to step S6 every time the program is executed. In step S6, the CPU 8a adds the joule heat J, which corresponds to the detected current value Id, to the cumulative value of the previous cycle in step S6. The CPU 8a performs a calculation using equation (2). In this case, the arc heat A and the radiated heat L both take the value of 0.

$$F(J, A, L) = \text{cumulative value of previous cycle} + \text{present joule heat } J \quad (2)$$

The arc heat A is the heat of an arc produced by the overcurrent. An arc is produced between a circuit wiring and a conductive body when the circuit wiring contacts the conductive body. The voltage applied to a circuit of an automobile is constant, and the arc time is extremely short. Thus, the value of the arc heat A generated by a single arc is constant.

In the preferred embodiment, the voltage of the automobile battery BT is about 12V (volts) and constant. Thus, the value of the generated arc heat A is measured beforehand. The predetermined arc heat A is stored in the ROM 8b.

When an overcurrent is detected in the previous execution but not during the present execution, the CPU 8a determines that an arc has been generated and proceeds from step S11 to step S6. In step S6, the CPU 8a adds the predetermined arc heat A to the cumulative value N. The CPU 8a performs a calculation using equation (3). In this case, the joule heat J and the radiated heat L both take the value of 0.

$$F(J, A, L) = \text{cumulative value of previous cycle} + \text{predetermined arc heat } A \quad (3)$$

The radiated heat L is the heat radiated during the OFF time of the overcurrent (the time during which overcurrent does not flow) and is proportional to the OFF time. The radiated heat L per unit time (in the preferred embodiment, the interval of program interruptions) is a value that is measured beforehand. The predetermined radiated heat L is stored in the ROM 8b.

When the OFF time continues, the CPU 8a proceeds from step S12 to step S6 each time the program is executed. The CPU 8a subtracts the predetermined radiated heat L from the cumulative value of the previous cycle. The CPU 8a performs a calculation using equation (4). In this case, the joule heat J and the arc heat A both take the value of 0.

$$F(J, A, L) = \text{cumulative value of previous cycle} - \text{predetermined radiated heat } L \quad (4)$$

In step S6, the CPU 8a adds or subtracts the present heat to or from the cumulative value of the previous cycle to calculate the total heat (present cumulative value). The CPU 8a then temporarily stores the total heat in the RAM 8c.

In step S7, the CPU 8a determines whether the total heat N is less than or equal to a predetermined value K. The predetermined value K is less than or equal to the tolerated heat of the electric wiring. The predetermined value K, which corresponds to the electric wire that is used, is determined beforehand through experiments. The predetermined value K is set, for example, so that the coating of the wire does not fume.

When the CPU 8a determines that the total heat N is less than or equal to the predetermined value K in step S7, the CPU 8a temporarily terminates the program. When the CPU 8a determines that the total heat N exceeds a predetermined value K, the CPU 8a determines that a rare short circuit has occurred in the load circuit 5.

When determining that a rare short circuit has occurred, the CPU 8a proceeds to step S8 and outputs the FET OFF signal. The FET OFF signal causes the portion between the drain and source of the FET 4 to be non-conductive and stops the flow of current to the load circuit 5. This protects the load circuit 5. Then, the CPU 8a completes the program.

The program will now be discussed with reference to the time chart of FIG. 4.

Figure 4:
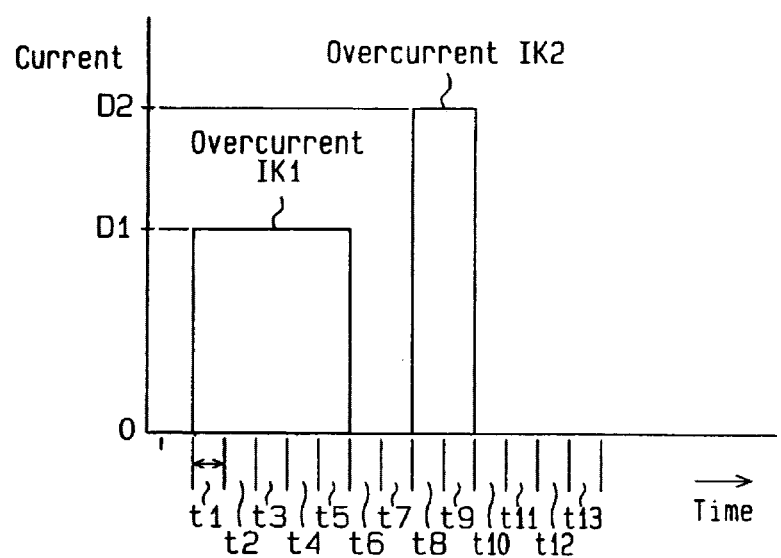
FIG. 4 is a time chart illustrating overcurrent.

FIG. 4 shows bars representing overcurrents IK1 and IK2. In FIG. 4, time segments t0 to t13 each represent a predetermined time. The program of FIG. 3 is executed in an interrupting manner in each of the time segments t0 to t13.

In FIG. 4, the overcurrent IK1 exceeds the predetermined threshold value in time segments t1 to t5, and the overcurrent IK2 exceeds the predetermined threshold value in time segments t8 to t9.

Steps S1 to S6 of the program are executed during time segments t1 to t5 for overcurrent IK1 and during time segments t8 to t9 for overcurrent IK2. The joule heat J is added to the cumulative value of the previous cycle in each of these time segments t1–t5 and t8–t9.

Between time segments t5–t6 and t9–t10, the current values of the overcurrents IK1, IK2 respectively decrease from D1, D2 to 0. Thus, the CPU 8a recognizes that an arc has been produced. The CPU 8a performs steps S2, S9–S11, and S6 of the program and adds the arc heat A to the cumulative value of the previous cycle.

Time segments t6–t7 and t10–t13 each correspond to an OFF time. During the OFF time, the CPU 8a recognizes that the wiring is radiating heat. The CPU 8a repeats steps S2, S9, S12, S6 of the program and subtracts the radiated heat L from the cumulative value of the previous cycle.

The rare short circuit determining device, or fuse element 50, of the preferred embodiment has the advantages described below.

(1) Whenever the program is executed, the control circuit 6 (CPU 8a) of the fuse element 50 adds or subtracts the joule heat J, the arc heat A, or the radiated heat L to or from the cumulative heat, which was obtained during the previous cycle. The CPU 8a determines whether the present total heat (total cumulated heat of the load circuit) N is within a tolerated range. If the total heat N exceeds the threshold value K, the control circuit 6 determines that a rare short circuit, which results from the generation of heat exceeding a predetermined value, has occurred in the load circuit 5 and stops supplying current to the load circuit 5.

Thus, in the preferred embodiment, the supply of current to the load circuit 5 is stopped when one of the following conditions are satisfied. This protects the load circuit 5 and its wiring.

(a) A large amount of joule heat J is produced.

This condition is satisfied when, for example, the overcurrent continuous time (ON time) is relatively long. Alternatively, the condition may be satisfied when overcurrent is produced many times within a short period of time such that the ON time is long.

(b) A large amount of arc heat A is produced.

This condition is satisfied when, for example, overcurrent is produced many times within a short period of time. The arc heat increases in proportion to the number of times the overcurrent is produced.

(c) A large amount of joule heat J and a large amount of arc heat A are produced.

(2) The predetermined value K of the total cumulated heat is varied as required to protect the load circuit 5 from various levels of overcurrent without melting the fuse.

(3) In the fuse element 50, the parameter for determining the occurrence of a rare short circuit is the total heat N, which is calculated from the joule heat J, the arc heat A, and the radiated heat L. Accordingly, the employment of the total heat N as a parameter for determining the occurrence of a rare short circuit detects the heating of the circuit wiring in an optimal manner and determines the occurrence of a rare short circuit without using a complicated device.

(4) The fuse 2 is used as a sensor in the fuse element 50. Thus, if a dead short circuit occurs in the load circuit 5, the fuse 2 melts and breaks to protect the load circuit 5. Further, the load current IL is detected with a simple structure.

(5) The preferred embodiment is focused on rare short circuits. However, the fuse element 50 may also be applied for dead short circuits that do not produce arcs.

It should be apparent to those skilled in the art that the present invention may be embodied in many other specific forms without departing from the spirit or scope of the invention. Particularly, it should be understood that the present invention may be embodied in the following forms.

A resistor or thermistor may be used as the sensor 2. Alternatively, the sensor 2 may be any type of element or circuit that detects the load current IL, such as an ammeter.

The application of the rare short circuit determination device is not limited to the fuse element 50 in the automobile and may be applied to other electric circuits.

The present examples and embodiments are to be considered as illustrative and not restrictive, and the invention is not to be limited to the details given herein, but may be modified within the scope and equivalence of the appended claims.

What is claimed is:

1. A blade fuse element for determining whether a rare short circuit, which results from the generation of heat exceeding a predetermined value, has occurred in a load circuit, the blade fuse element comprising:

a fuse portion which serves as a sensor for detecting a load current, which flows through the load circuit, and for generating a detection signal, wherein the fuse portion melts and breaks when a dead short circuit occurs in the load circuit; and a determining circuit connected to the fuse portion for determining whether a rare short circuit has occurred, wherein the determination circuit calculates one of a first parameter and a second parameter every predetermined time interval based on the detection signal, the first parameter relating to a first time period during which the load current exceeds a predetermined reference current value, and the second parameter relating to a second time period during which the load current is less than or equal to the predetermined reference current value, wherein the determining circuit cumulates the calculated one of the parameters every predetermined time interval to calculate a cumulative parameter value and determines whether a rare short circuit has occurred based on the cumulative parameter value.

2. The blade fuse element according to claim 1, wherein the determining circuit is connected to a shutdown circuit for stopping the supply of the load current from a power supply to the load circuit, and wherein the determining circuit controls the shutdown circuit to stop supplying the load circuit with the load current when it is determined that a rare short circuit has occurred.

3. The blade fuse element according to claim 1, wherein the first parameter is one of joule heat and arc heat that are generated in relation with the first time period in the load circuit, the second parameter is radiated heat radiated from the load circuit during the second time period, and the determining circuit calculates one of the joule heat, the arc heat, and the radiated heat.

4. The blade fuse element according to claim 3, wherein the determining circuit cumulates the calculated one of the heats to calculate a total heat and determines whether a rare short circuit has occurred based on the total heat.

5. The blade fuse element according to claim 4, wherein the determining circuit determines that a rare short circuit has occurred when the total heat exceeds a predetermined value.

6. The blade fuse element according to claim 5, wherein the determining circuit adds the joule heat or the arc heat and subtracts the radiated heat when calculating the total heat.

7. The blade fuse element according to claim 6, wherein the determining circuit is connected to a shutdown circuit for stopping the supply of the load current from the power supply to the load circuit, and wherein the determining circuit controls the shutdown circuit to stop supplying the load circuit with the load current when it is determined that a rare short circuit has occurred.

8. The blade fuse element according to claim 1, wherein the blade fuse element is detachably installed in a vehicle electric circuit.

9. The blade fuse element according to claim 1, wherein said predetermined time interval is shorter than a time during which a rush current is produced.

10. The blade fuse element according to claim 1, wherein said predetermined time interval is 1 millisecond.

* * * * *